United States Patent
Min

(10) Patent No.: US 9,656,550 B2
(45) Date of Patent: May 23, 2017

(54) METHOD FOR CONTROLLING VEHICLE DRIVING

(71) Applicant: Hyundai Motor Company, Seoul (KR)

(72) Inventor: Jeong Seon Min, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/921,777

(22) Filed: Oct. 23, 2015

(65) Prior Publication Data

US 2016/0375765 A1    Dec. 29, 2016

(30) Foreign Application Priority Data

Jun. 24, 2015   (KR) ........................ 10-2015-0090045

(51) Int. Cl.
*B60K 28/02*  (2006.01)
*B60K 31/00*  (2006.01)

(52) U.S. Cl.
CPC .............. *B60K 28/02* (2013.01); *B60K 31/00* (2013.01)

(58) Field of Classification Search
CPC ................................ B60K 31/00; B60K 28/02
See application file for complete search history.

(56) References Cited

U.S. PATENT DOCUMENTS

| | | | | |
|---|---|---|---|---|
| 6,157,884 A * | 12/2000 | Narita | ................. | F16H 61/6648 477/34 |
| 2001/0041955 A1* | 11/2001 | Nada | ..................... | B60K 6/445 701/29.2 |
| 2004/0195022 A1* | 10/2004 | Inoue | ................. | B60K 31/0008 180/170 |
| 2004/0215385 A1* | 10/2004 | Aizawa | .................. | B60K 31/00 701/93 |
| 2010/0063661 A1* | 3/2010 | Saito | ...................... | B60K 6/445 701/22 |
| 2012/0259524 A1* | 10/2012 | Miyazaki | .............. | B60W 50/10 701/70 |
| 2013/0173113 A1* | 7/2013 | Takiguchi | ............ | B60K 26/021 701/36 |
| 2013/0261889 A1* | 10/2013 | Sekine | ................ | B60W 30/143 701/36 |
| 2014/0222296 A1* | 8/2014 | Takeuchi | ............ | B60W 50/082 701/48 |
| 2015/0073620 A1* | 3/2015 | Matsumura | ........... | B60W 30/00 701/1 |

(Continued)

FOREIGN PATENT DOCUMENTS

| | | |
|---|---|---|
| JP | 2006-336601 A | 12/2006 |
| JP | 2013-224074 A | 10/2013 |
| KR | 10-0395012 B1 | 8/2003 |

(Continued)

*Primary Examiner* — Thomas Tarcza
*Assistant Examiner* — Alex C Dunn
(74) *Attorney, Agent, or Firm* — Morgan Lewis & Bockius LLP

(57) ABSTRACT

A method for controlling a vehicle driving may include determining whether a vehicle is driving at a fixed speed, recording, including detecting a change in a vehicle speed or a state change of a vehicle speed change device while driving and storing a change pattern when the vehicle is driving at the fixed speed, determining a driver's driving intention based on the detected change pattern, and controlling the driving state of the vehicle depending on the determined driving intention.

8 Claims, 3 Drawing Sheets

(56) References Cited

U.S. PATENT DOCUMENTS

2015/0106007 A1\* 4/2015 Matsumura ......... B60W 30/143
                                                        701/408

FOREIGN PATENT DOCUMENTS

| KR | 10-2008-0032003 A | 4/2008 |
| KR | 10-2013-0053473 A | 5/2013 |
| KR | 10-1448765 B1 | 10/2014 |
| KR | 10-1515012 B1 | 4/2015 |

\* cited by examiner

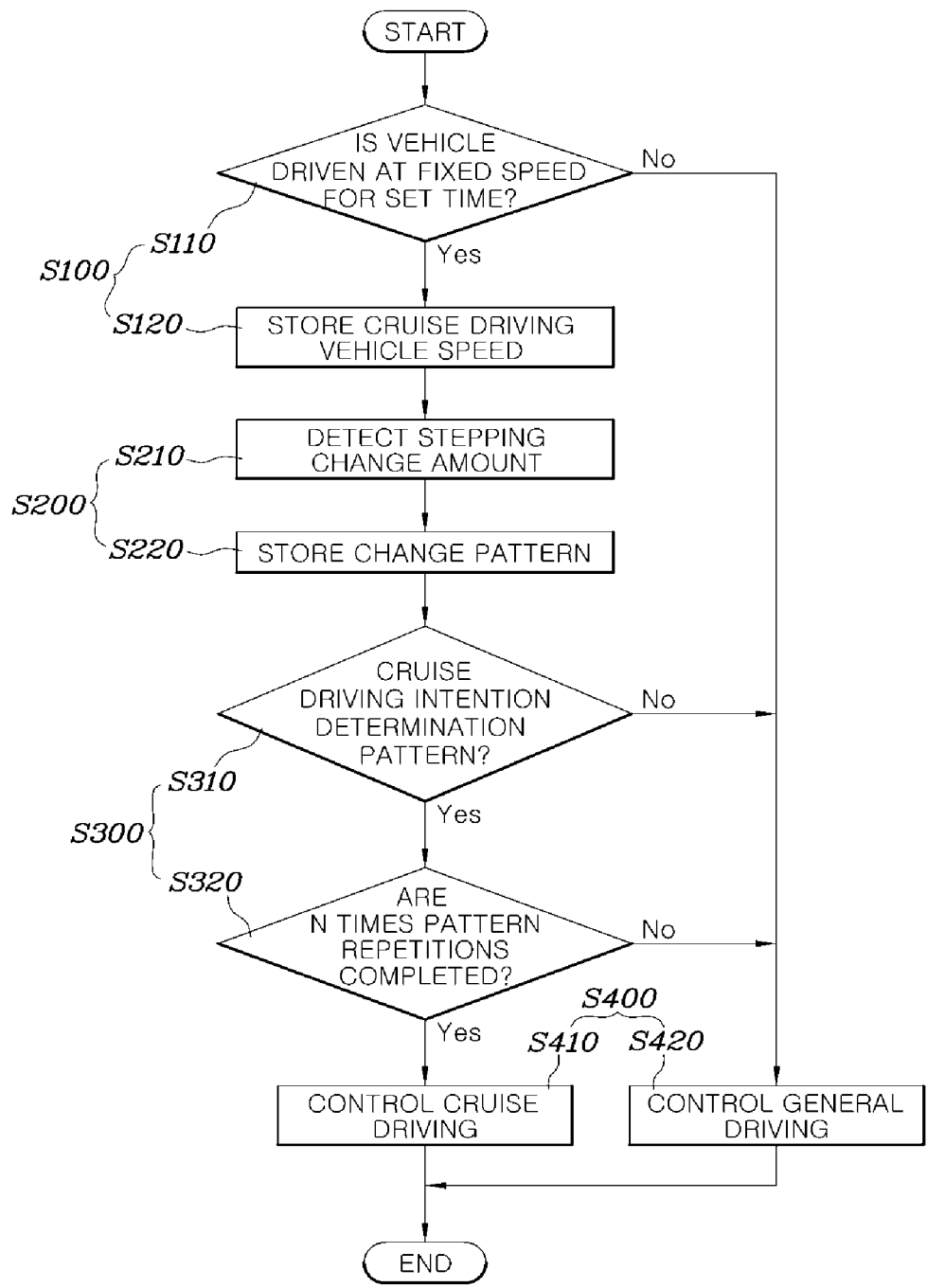

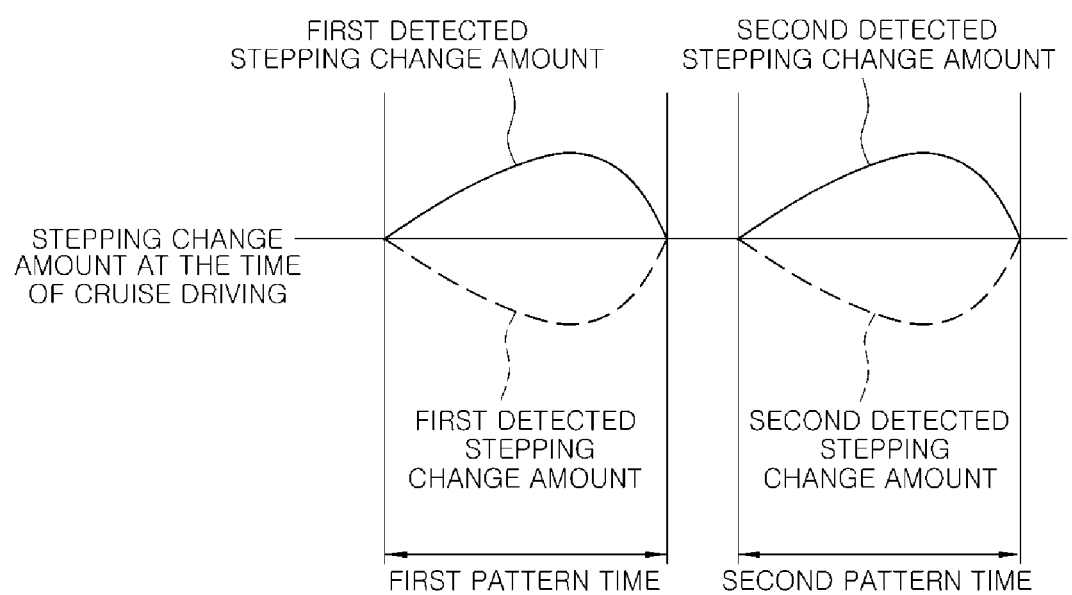

METHOD FOR CONTROLLING VEHICLE DRIVING

CROSS REFERENCE TO RELATED APPLICATION

The present application claims priority to Korean Patent Application No. 10-2015-0090045, filed Jun. 24, 2015, the entire contents of which is incorporated herein for all purposes by this reference.

BACKGROUND OF THE INVENTION

Field of the Invention

The present invention relates to a method for controlling a vehicle driving, and more particularly, to a method for controlling a vehicle driving capable of driving a vehicle at a fixed speed even though a change in an accelerator pedal occurs unintentionally.

Description of Related Art

When vehicles are driving on clogged roads or flat (non-curved, etc.) roads, if drivers complete accelerating their own vehicles at their desired speed, the drivers tend to drive their own vehicles at a fixed speed. However, as a cruise driving time is getting longer, the weak drivers like the elderly or women lift their ankles pressing the accelerator pedal up bit by bit and thus a vehicle speed is gradually reduced and a driver who is not used to a driving holds on his/her ankle tightened due to the tension in the ankle and thus the vehicle speed is gradually increased unintentionally. This brings about an unnecessary change in a vehicle speed, and drivers need to frequently check the vehicle speed.

FIG. 1 is a graph illustrating a change in a vehicle speed in response to a vehicle driving state. As illustrated in FIG. 1, there may first be a speed change section A in which the vehicle speed is repeatedly changed like the case in which the vehicle is driving on a curved road and a rough road, in a city, etc., at the early time of vehicle driving and there may be a first cruise driving section B in which a vehicle is driving at a fixed speed after the vehicle enters a highway or a motorway in a state where the vehicle may be continuously driven at a fixed speed However, it is difficult for a driver to continuously maintain the same stepping amount of the accelerator pedal. For this reason, the phenomenon that the stepping amount is repeatedly increased or reduced and then reduced or increased may occur in a second cruise driving section C of FIG. 2.

When the change in the stepping amount continuously occurs in the second cruise driving section C, fuel efficiency of a vehicle deteriorates and the inconvenience of user is induced, thereby degrading marketability of a vehicle.

To solve the above problem, some of the vehicles include a cruise control function and a cruise driving apparatus, but many drivers rarely use the functions or rarely know the functions. Further, since many drivers have anxiety about taking their foot off the pedal, a method for driving a vehicle at a fixed speed by continuously stepping a pedal has been adopted. Further, when the cruise control is released due to a manipulation of a brake pedal, the drivers need to again set the cruise control, which is one of causes for which the functions are rarely used.

Therefore, there is a need to improve driving convenience by driving a vehicle at a fixed speed as a driver wanted while manipulating the accelerator pedal and to improve fuel efficiency by preventing an unnecessary change in a stepping signal.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling a vehicle driving, capable of driving a vehicle at a fixed speed even though a predetermined stepping change amount occurs, while keeping an accelerator pedal in a stepped state.

According to various aspects of the present invention, a method for controlling a vehicle driving may include determining whether a vehicle is driving at a fixed speed, recording, including detecting a change in a vehicle speed or a state change of a vehicle speed change device while driving and storing a change pattern when the vehicle is driving at the fixed speed, determining a driver's driving intention based on the detected change pattern, and controlling the driving state of the vehicle depending on the determined driving intention.

In the determining, when it is determined that the vehicle is constantly driving at a same fixed speed for a preset time, it may be determined that the vehicle is now driving at the fixed speed and a cruise driving vehicle speed may be stored.

The vehicle speed change device may include an accelerator pedal and in the recording, the stepping change amount of the accelerator pedal may be detected and the change pattern of the stepping change amount may be stored.

In the determining of the driver's driving intention, when a change pattern in which the detected stepping change amount is increasing or decreasing and then is converged to a value before the stepping change amount is increased or decreased is provided several times, it may be determined that the driver has a cruise driving intention.

In the controlling, when the stepping change amount is re-detected, the detected stepping change amount is compared with at least one of a plurality of change patterns, and the detected stepping change amount is positioned within the set range from at least one pattern, the vehicle may be driven at a cruise driving vehicle speed independent of the stepping change amount.

In the determining of the driver's driving intention, when values of the change pattern which are formed later are included in a time range and a stepping change amount which are set based on a first formed change pattern among the plurality of change patterns, it may be determined that each of the change patterns is repeated.

In the determining of the driver's driving intention, when it is determined that the driver does not have the cruise driving intention, in the controlling, the vehicle may be driven in response to the detected stepping change amount.

In the determining of the driver's driving intention, when the change pattern in which the value when the detected stepping change amount is increasing or decreasing is smaller than that when the detected stepping change amount is converged to the value before the detected stepping change amount is increasing or decreasing is provided several times, it may be determined that the driver has the cruise driving intention.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a flow chart of an exemplary method for controlling a vehicle driving according to the present invention.

FIG. 3 is a diagram illustrating a change pattern when a change in stepping amount of an accelerator pedal occurs according to the present invention.

Figure 1:
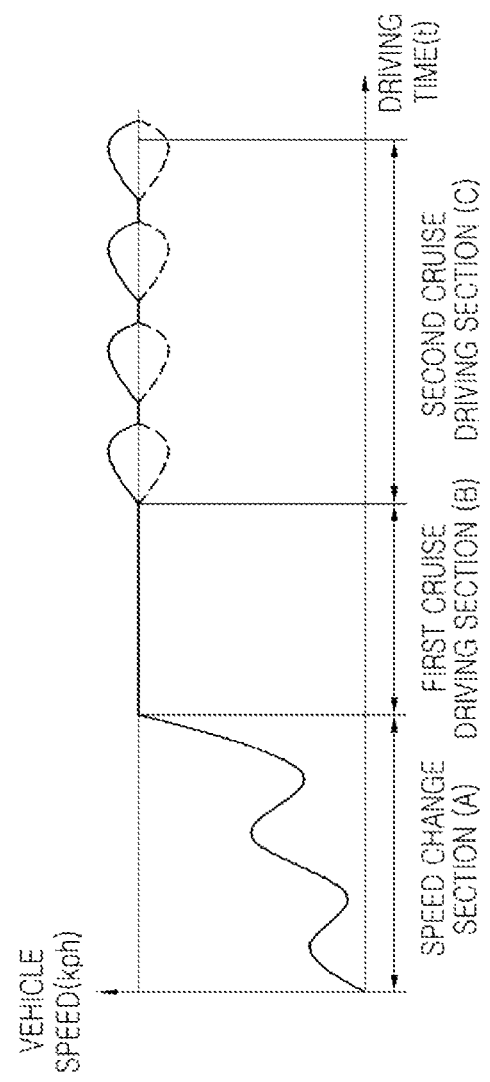
FIG. 1 is a graph illustrating a change in a vehicle speed in response to a vehicle driving state of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 2 is a flow chart of a method for controlling a vehicle driving according to various embodiments of the present invention. The method for controlling a vehicle driving includes determining whether a vehicle is driving at a fixed speed (S100), if it is determined that the vehicle is driving at the fixed speed, recording (S200) which includes detecting a change in a vehicle speed or a state change of a vehicle speed change device while driving (S210) and storing a change pattern when the vehicle is driving at a constant speed (S220), determining a driver's driving intention based on the detected change pattern (S300), and controlling the driving state of the vehicle depending on the determined driving intention (S400).

In detail, in the determining (S100), if it is determined that the vehicle is constantly driving at the same fixed speed for a preset time, it is determined that the vehicle is now driving at the fixed speed (S110) and the cruise driving vehicle speed may be stored (S120). Preferably, if the vehicle drives a section in which the vehicle speed is repeatedly changed like the case in which the vehicle is driving on a curved road or a rough road and then maintains a driving state at a fixed speed for a set time, it may be determined that the vehicle is now driving at the fixed speed.

The set time may be a time value set according to designer's intention or may be variously set according to designer's intention, such as time from timing at which a vehicle starts to be driven at a fixed speed before a change in stepping amount of an accelerator pedal occurs.

After it is determined that the vehicle is driving at a fixed speed, the recording (S200) may be performed. Here, the vehicle speed change device may include an accelerator pedal and in the recording (S200), the stepping change amount of the accelerator pedal is detected (S210) and the change pattern of the stepping amount is stored (S220). The stepping change amount may be an increasing or decreasing slope value of the stepping amount.

The change pattern in the stepping amount is as illustrated in FIG. 3. FIG. 3 is a diagram illustrating the change pattern when the change in stepping amount of the accelerator pedal occurs and illustrates the change in stepping amount over time. As such, in the recording (S200), the change in stepping amount over time, that is, the change pattern drawing the stepping change amount for a set time is stored (S220). The set time in the change pattern may be variously set according to the designer's intention, but the time when a stepping amount deviates from a stepping amount at the time of a cruise driving due to the increase or decrease in stepping amount and then returns to the stepping amount at the time of the cruise driving, that is, the time when the stepping change amount is increasing or decreasing and then returns to an initial value may be set as the set time.

Meanwhile, the determining of the driver's driving intention (S300) using the stored change pattern may be performed using the stored change pattern. As illustrated in FIG. 3, in the determining of the driver's driving intention (S300), if a change pattern (S310) in which the detected stepping change amount is increasing or decreasing from the initial value at the time of the cruise driving, for example, a slope value of 0 and then is converged to the initial value (slope 0) before the detected stepping change amount is increasing or decreasing is provided several times, it may be determined that the driver has the cruise driving intention (S320).

The driver has the cruise driving intention, but when the fluid change in the accelerator pedal occurs, the change pattern of the stepping amount in which the stepping amount is increasing or decreasing at a stepping amount for maintaining the cruise driving speed and then is converged to the stepping amount for maintaining the cruise driving speed may be drawn. When the pattern is repeatedly generated as much as a frequency determined to be appropriate according to the designer's intention, it is determined that the driver does not want to accelerate and decelerate a vehicle but wants to drive a vehicle at a fixed speed. As a result, the controlling may be performed.

In addition, in the determining of the driver's driving intention (S300), if the change pattern in which the value when the detected stepping change amount is increasing or decreasing is smaller than that when the detected stepping change amount is converged to the value before the detected stepping change amount is increasing or decreasing is provided several times, it may be determined that the driver has the cruise driving intention (S320).

When the driver has the cruise driving intention but the pedal effort is fluidly changed, the driver gradually steps the pedal or gradually takes off the pedal and then may momentarily recover the pedal to keep the vehicle the cruise driving speed at one point. As a result, if the change amount in pedal effort when the pedal effort is increasing or decreasing is even smaller than that when the pedal effort is converged to the state before the pedal effort is increasing or decreasing, it may be determined that the driver has the cruise driving intention but shows the unintended motion (S320).

Further, as illustrated in FIG. 3, the plurality of change patterns may have different values in the stepping change amount over time. Therefore, if time values and stepping change values of change pattern which are formed later are included in a time range and a set stepping change amount which are set based on the first formed change pattern among the plurality of change patterns, it may be determined that in each of the change patterns, change patterns matching each other are repeated.

For example, if the time when the increasing or decreasing slope (stepping change amount) of the first formed change pattern is 1 or −1 and the slope is increasing and decreasing and then is converged to a slope of 0 is 10 seconds, the set stepping change amount may be set to have a slope larger than 0.9 and smaller than 1.1 and the set time range may be set to be equal to or more than 7 seconds. In this case, an upper bound of the set time range may be designated.

If the values of the subsequent formed change pattern are included in the ranges, it may also be determined that each of the change patterns matches each other.

In addition to the range, various elements of the change pattern, for example, a maximum change value and change values per unit time may be considered in the change pattern matching and each set value and all the set values may be variously set according to the designer's intention.

Meanwhile, in the controlling (S400), if the stepping change amount is re-detected, the detected stepping change amount is compared with any one selected from the plurality of change patterns, for example, the first pattern, and the detected stepping change amount is positioned within the set range from any one pattern, a vehicle may be driven at a cruise driving vehicle speed independent of the stepping change amount (S410).

As described above, the set range may be set ranges in which may be determined whether the patterns match each other.

When the driver drives a vehicle with the cruise driving intention, the foregoing change pattern may be repeatedly generated and when the change pattern is repeated as many as frequency in which it may be determined that the driver has the cruise driving intention (S320), the controlling (S400) may be applied to the change pattern which is identically generated at the time of the following detection. That is, in the controlling (S400), even though the stepping of the pedal is changed while forming the change pattern, the stepping change amount does not substantially cause the change in a vehicle speed and the vehicle is driven in response to the stored cruise driving vehicle speed (S410).

Therefore, although the driver repeatedly draws the change pattern and generates a slight change in the stepping change amount, the change does not affect the vehicle driving and the change in an engine RPM, thereby implementing a stable driving without generating unnecessarily additional fuel injection and an engine load.

Meanwhile, in the determining of the driver's driving intention (S300), if it is determined that the detected stepping change amount deviates from the foregoing set values and thus the driver does not have the cruise driving intention or the foregoing cruise driving control condition is not satisfied, in the controlling (S400), it is preferable to perform a general driving control (S420) to accelerate or decelerate a vehicle in response to the detected stepping change amount.

As described above, according to the method for controlling a vehicle driving, it is possible to improve the convenience of a user by driving the vehicle at a fixed speed based on the stepping of the accelerator pedal, without the installation of the additional apparatus.

Further, it is possible to improve the fuel efficiency of the vehicle by preventing the repeated change in the pedal.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a vehicle driving, comprising:
determining, by a controller, whether a vehicle is driving at a fixed speed;
recording, including detecting a change in a vehicle speed or a state change of a vehicle speed change device by the controller using a speed sensor or an accelerator pedal sensor while driving and storing by the controller a change pattern when the vehicle is driving at the fixed speed;
determining by the controller, a driver's driving intention based on the detected change pattern; and
controlling the driving state of the vehicle depending on the determined driving intention by the controller using a brake or an acceleration system of the vehicle.

2. The method of claim 1, wherein in the determining, when it is determined that the vehicle is constantly driving at a same fixed speed for a preset time, it is determined that the vehicle is now driving at the fixed speed and a cruise driving vehicle speed is stored.

3. The method of claim 2, wherein the vehicle speed change device includes an accelerator pedal and in the recording, the stepping change amount of the accelerator pedal is detected and the change pattern of the stepping change amount is stored.

4. The method of claim 3, wherein in the determining of the driver's driving intention, when a change pattern in which the detected stepping change amount is increasing or decreasing and then is converged to a value before the stepping change amount is increased or decreased is provided several times, it is determined that the driver has a cruise driving intention.

5. The method of claim 4, wherein in the controlling, when the stepping change amount is re-detected, the detected stepping change amount is compared with at least one of a plurality of change patterns, and the detected stepping change amount is positioned within the set range from at least one pattern, the vehicle is driven at a cruise driving vehicle speed independent of the stepping change amount.

6. The method of claim 4, wherein in the determining of the driver's driving intention, when values of the change pattern which are formed later are included in a time range and a stepping change amount which are set based on a first formed change pattern among the plurality of change patterns, it is determined that each of the change patterns is repeated.

7. The method of claim 4, wherein in the determining of the driver's driving intention, when it is determined that the driver does not have the cruise driving intention, in the controlling, the vehicle is driven in response to the detected stepping change amount.

8. The method of claim 4, wherein in the determining of the driver's driving intention, when the change pattern in which the value when the detected stepping change amount is increasing or decreasing is smaller than that when the detected stepping change amount is converged to the value before the detected stepping change amount is increasing or decreasing is provided several times, it is determined that the driver has the cruise driving intention.

\* \* \* \* \*